July 17, 1962 J. E. HICKERSON 3,044,690

CODE CONVERTING MECHANISM

Filed Jan. 22, 1960 4 Sheets-Sheet 1

INVENTOR
JOHN E. HICKERSON

BY Ralph C. Dustin
ATTORNEY.

July 17, 1962 J. E. HICKERSON 3,044,690

CODE CONVERTING MECHANISM

Filed Jan. 22, 1960 4 Sheets-Sheet 2

July 17, 1962 J. E. HICKERSON 3,044,690
CODE CONVERTING MECHANISM
Filed Jan. 22, 1960 4 Sheets-Sheet 4

United States Patent Office 3,044,690
Patented July 17, 1962

3,044,690

CODE CONVERTING MECHANISM

John E. Hickerson, Lexington, Ky., assignor to International Business Machines Corporation, New York, N.Y., a corporation of New York Filed Jan. 22, 1960, Ser. No. 4,045
5 Claims. (Cl. 234—69)

This invention relates to code converting mechanisms, and more particularly to mechanisms having elements operating in response to the sensing of designations representative of one code and controlling the operation of other elements according to a second code.

Many different codes are employed in the operation of printers, tape punches, computers, etc. For instance, all telegraphic equipment operates on a five channel code. Various business machines, however, operate on six and eight channel codes. Some machines may operate on the same number of code channels as others but with different code combinations. It is frequently desirable that a machine responsive to a given code be caused to operate from different code designations produced by another machine. This may be accomplished by employing a mechanism which operates in response to the code produced by one machine and converts it to the code which is readable by the other.

A preferred form of the invention may include two groups of slides, the number of slides in one group being equal to the number of index points at which holes may be punched to represent any character in a tape to be read, and the number of slides in the other group being equal to the number of points at which holes are to be punched according to a different code in a new tape. The slides of both groups have openings which are aligned at some one of a plurality of points when the slides of the first group are moved in response to the sensing of a character on the tape to be read. A pin then moves through the aligned openings and limits movement of the second group of slides to effect punching of holes in the new tape according to a different code. Movement of slides in the second group may effect some other function, such as printing, if desired. United States Patent No. 2,978,086, issued April 4, 1961, to J. E. Hickerson shows similar slides operating to effect both printing and punching.

An object of this invention is to provide an improved code converting mechanism.

Another object is to provide an improved mechanism having two groups of movable elements, one group operating in response to a code to be read and determining movement of elements in the other group according to a different code pattern.

Yet another object is to provide a mechanism having elements which are operable to sense holes punched in a tape according to one code pattern and to determine operation of other elements for effecting a punching of holes in another tape according to a different code pattern.

Other objects of the invention will be pointed out in the following description and claims and illustrated in the accompanying drawings, which disclose, by way of example, the principle of the invention and the best mode, which has been contemplated, of applying that principle.

Figure 4:
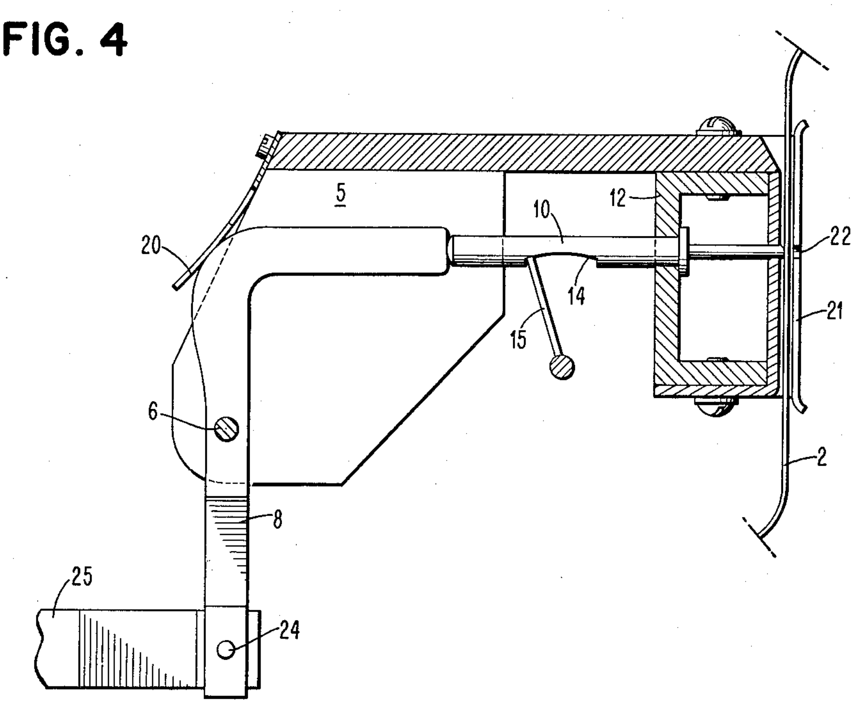
FIG. 4 is an enlarged horizontal sectional view of the tape sensing mechanism shown in FIG. 1.

As shown by the drawings, an improved code converting mechanism, generally designated 1, operates to sense holes punched in a tape 2 according to a six channel code and to effect a punching of holes in a tape 3 according to a five channel code. It will be understood that tapes 2 and 3 may have any number of channels in which holes may be punched. Mounted on a base plate 4 adjacent the tape 2 is a frame 5 carrying a pin 6 on which a plurality of crank members 8 are pivotally supported. As shown more clearly in FIG. 4, each of the crank members acts against one end of a sensing pin 10 slidably supported by a housing 12 attached to the frame 5. There is one sensing pin for each channel in the tape 2, and the pins are so arranged as to extend through holes in the tape when moved to the right. If there isn't a hole in the tape opposite a pin, that pin and the crank member associated therewith are held by the tape against movement.

Figure 1:
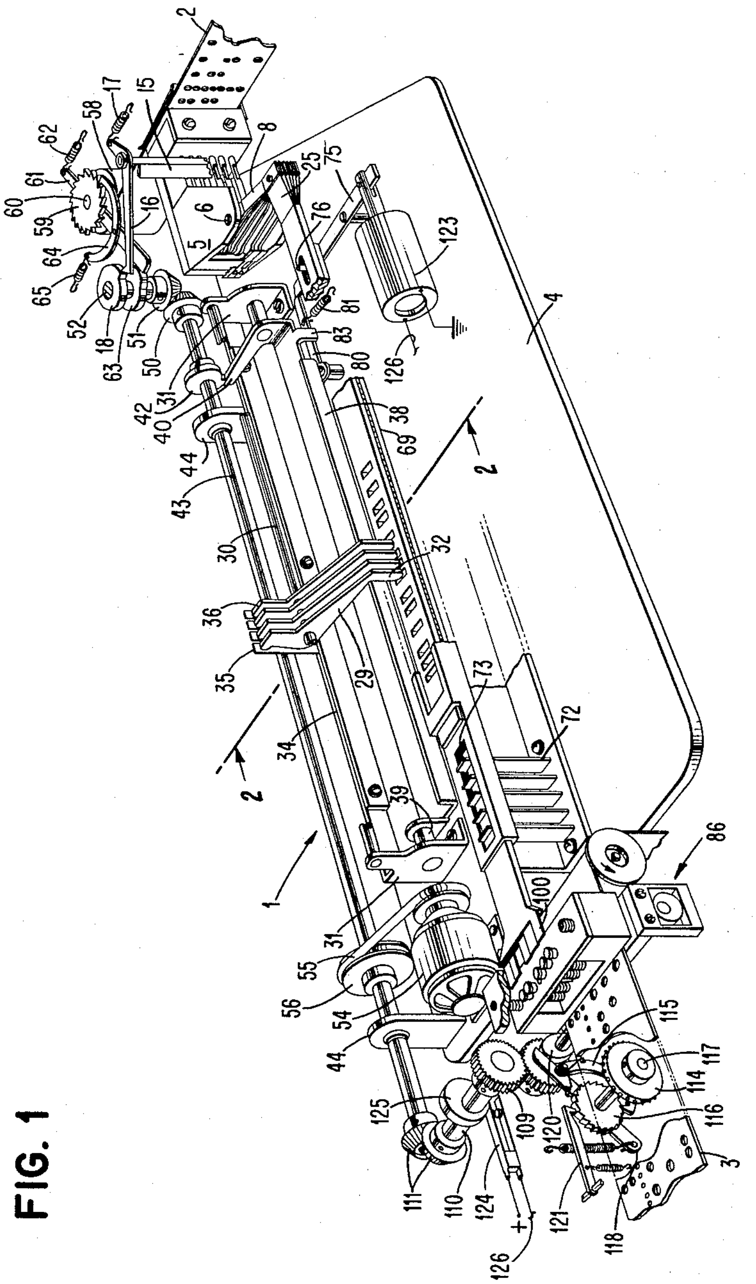
FIG. 1 is a perspective view of the improved code converting mechanism.

Formed in one side of each of the pins 10 is a notch 14 receiving the outer edge of a bail 15 which is pivotally supported at its lower end by any suitable means, not shown, mounted on the base plate 4. Connected to the upper end of the bail 15, see FIG. 1, is an arm 16 which is held by a spring 17 in engagement with a cam 18. The arm normally engages a high portion of the cam for holding the bail 15 in the position shown in FIG. 4 so it retains the sensing pins 10 in their retracted positions. Each of the crank members 8 is continuously urged in a clockwise direction about the pivot pin 6 by a leaf spring 20 connected at one end to the frame 5 and acting at its other end on the crank member. Upon rotating the cam 18 a short distance in a counter clockwise direction from the position shown, the arm 16 drops to a low point on the cam causing the bail 15 to swing in a clockwise direction and release the sensing pins 10. The crank members 8 are then operated by the springs 20 to move the sensing pins toward the tape 2 which passes between the housing 12 and a guide plate 21 fixed to the frame 5. Openings 22 are provided in the guide plate opposite the ends of the sensing pins so the latter may be extended through holes in the tape if any are sensed.

Figure 2:
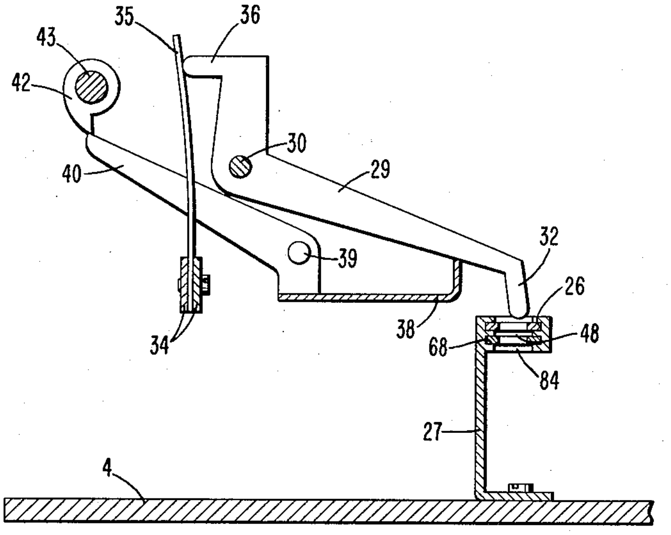
FIG. 2 is a cross sectional view of the mechanism taken on the plane of the line 2—2 in FIG. 1.

Pivotally connected to each of the crank members at 24 is a thin metal strip or slide 25 which extends through a channel-shaped portion 26 of a support 27 mounted on the base plate 4 as shown more clearly in FIG. 2. Each of the strips is only a few thousandths of an inch thick so the total thickness of the strips connected to the crank members may be in the range of one-sixteenth of an inch. The strips 25 may be referred to as translating or decoding slides since they are positioned longitudinally relative to each other according to the sensing of holes in the punched tape 2. In order to retain these slides within the channel-shaped portion 26, the latter may be partially closed, as shown in FIG. 1.

Arranged above the decoding slides 25 at index positions representative of the different characters to be read from the tape 2 are sensing members 29 pivotally supported on a rod 30 mounted at its ends in brackets 31 fixed to the base plate 4. Each of the members 29 has a finger portion 32 adapted to extend through openings in the slides if the latter have been positioned properly and the members are free to swing in a clockwise direction. Extending between the brackets 31 are plates 34 carrying leaf springs 35 which act on tail portions 36 of the members 29 for urging the latter continuously toward the slides 25. Underlying the sensing members 29 is a bail 38 pivotally supported at its ends on studs 39 carried by the brackets 31. Formed integral with the bail at its right end is an arm 40, FIG. 2, engaging a cam 42 fixed to a shaft 43 which is rotatably supported above the rear portion of the plate 4 by brackets 44. When the arm 40 engages the high portion of the cam, the bail 38 acts on the members 29 to hold them in positions with their finger portions just above the slides 25. As a low portion on cam 42 comes opposite the arm, the bail 38 rocks downwardly and permits the members 29 to be moved by the springs 35 toward the slides.

Figure 5:
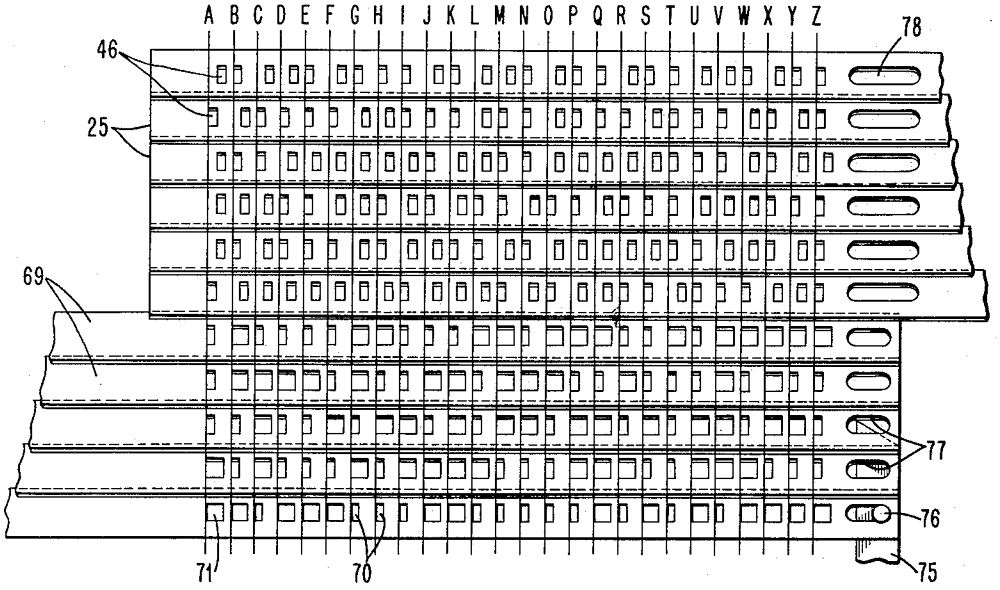
FIG. 5 is a developed view of the translating and encoding slides with openings therein at different index positions representative of the alphabetic characters.

As shown in FIG. 5, each of the slides 25 has for each index position an opening 46 which is located either at the index position or a short distance to the right of it. With the slides in positions assumed when the sensing pins 10 are held retracted from the punched tape 2, there is no index position at which all of the openings 46 are in alignment. As the pins 10 move through holes in the tape 2 upon actuation of the bail 15, the slides connected to pins passing through holes are moved to the left in FIGS. 1 and 5. The openings 46 in the slides at the index point corresponding to the character represented by the holes in the tape 2, are then in alignment so the finger portion 32 of the sensing member at that location may pass through. Openings 46 at all other index positions are out of alignment. Formed in the channel portion 26 of the support 27 at each index position is an opening 48, FIG. 2, through which the end of the finger portion may project after it passes through openings in the slides 25.

As the mechanisms operate from the positions shown in FIG. 1, the arm 16 first moves to a low point on cam 18 so the sensing pins 10 may be extended through any holes existing in the tape 2. This causes the slides corresponding to pins sensing holes to move to the left and effect an alignment of openings 46 at the index point for the character corresponding to that sensed. The arm 40 then moves to a low point on the cam 42 and permits the bail 38 to swing downwardly for effecting an engagement of the sensing members 29 with the slides. The finger portion of the member at the location where the openings 46 are aligned, passes through these openings for controlling other slides to be described later.

For driving the cam 18, there is provided a bevel gear 50 fixed to the shaft 43 and meshing with another bevel gear 51 on a shaft 52 to which the cam 18 is connected. Driving of the shaft 43 is accomplished by an electric motor 54 mounted on the base plate 4 and connected through a belt 55 and pulley 56 to the shaft 43.

The tape 2 is wound upon a take-up reel 58 to which a ratchet wheel 59 is connected. Pivotally mounted on a pin 60 at the axis of the reel is a lever 61 which is held by a spring 62 in engagement with a cam 63 fixed to the shaft 52. A dog 64 is pivotally mounted on the lever 61 and is held by a spring 65 in engagement with the ratchet wheel. On each rotation of the shaft 52, the lever 61 is oscillated to actuate the dog for rotating the ratchet wheel and the reel 58 one tooth space. This action takes place after the sensing members 29 have been withdrawn from openings in the slides 25 and the pins 10 have been retracted from holes in the tape 2.

Figure 7:
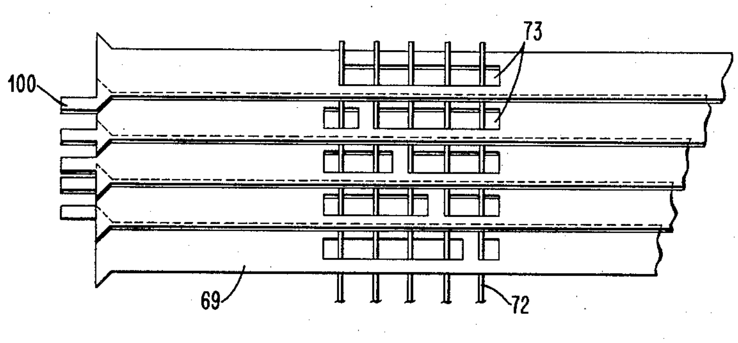
FIG. 7 is is a developed view of another portion of the encoding slides showing openings receiving spring arms which displace the slides when free.

Arranged beneath the slides 25 in a channel shaped portion 68 of the support 27, is a group of encoding slides 69. As shown in FIGS. 1 and 5, there are only five of these slides but the number may be greater or less depending on the code to which characters are to be converted. Slides 69 have openings 70 and 71, FIG. 5, in alignment with each other along their left hand edges at each index position. The openings 70 are just large enough to receive the finger portions of the sensing members 29 while the openings 71 are large enough to permit movement of the slides to the left while the finger portions extend through them. As shown by FIG. 1, slides 69 are continuously urged to the left by spring arms 72 fixed at their lower ends to the base plate 4 and extending upwardly through openings 73 in the slides. These openings are formed, see FIG. 7, so their left edges are staggered to provide a surface against which each spring arm can act for moving its slide independently of the others. The lengths of the openings are such that each slide is permitted to move without contacting the spring arms associated with the other slides.

All of the slides 69 are normally held against the action of the spring arms in positions with the left edges of their openings 70 and 71 in alignment. The holding means comprises a lever 75, FIG. 1 pivotally supported between its ends and carrying at one end a pin 76 which extends upwardly through slots 77 (see FIG. 5) in the slides 69 and slots 78 in the slides 25. The pin engages the slides 69 at the right hand edges of the slots 77 for holding them in positions to receive the sensing members 29. Each of these slots is long enough to permit a swinging of the lever 75 in a direction to disengage the pin 76 from the slides so the latter can move under the action of the spring arms 72 if they are not held by the sensing members 29. The slots 78 are long enough to permit movement of the slides 25 without interference by the pin 76.

At the inner end of the lever 75 is a latch 80 which is urged by a spring 81 to a position behind the lever for holding the latter against rotation under the action of the slides 69. Formed on the bail 38 is a flange 83 which operates to disengage the latch from the lever 75 just after the bail has dropped to a point at which any one of the sensing members 29 may have extended its finger portion through openings in both groups of slides 25 and 69. In order that the finger portions may extend completely through all of the openings in the slides 69, openings 84 are formed in the bottom of the channel-shaped portion 68. As soon as the latch 80 is disengaged from the lever 75, those slides 69 having elongated openings 71 at the index point where the sensing member passes through are caused to move to the left under the action of their corresponding spring arms 72.

Figure 3:
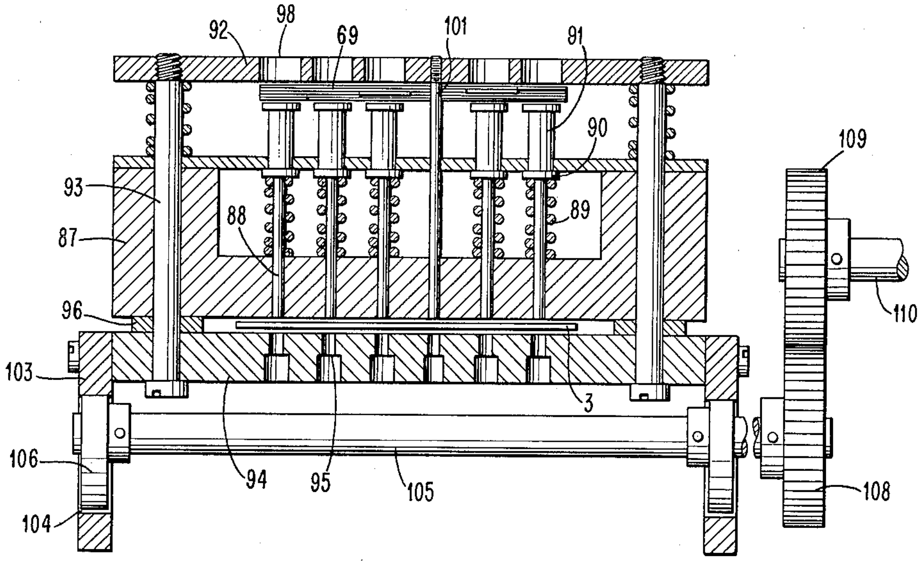
FIG. 3 is an enlarged cross sectional view of a tape punch controlled by the improved code converting mechanism.

Fixed to the base plate 4 adjacent the left ends of the slides 69 is a punch mechanism, generally designated 86, which operates to punch holes in the tape 3. This punch mechanism comprises, as shown more clearly in FIG. 3, a recessed block 87 having openings in which code punch pins 88 are slidably received. Springs 89 act between the block and washers 90 engaging enlarged head portions 91 on the punch pins for holding the latter normally in positions with their lower ends flush with the lower surface on the block. A stationary plate 92 carries bolts 93 which extend loosely through openings in the block and carry at their lower ends a die plate 94 having openings 95 through which the lower ends of the punch pins extend when the die plate is moved upwardly relative to the pins. Washers 96 are located between the block 87 and the die plate to provide a space through which the tape 3 may pass. Formed in the stationary plate 92 are openings 98 through which the enlarged head portions 91 may move if nothing obstructs their path. Each of the slides 69 is provided at its left end with a projecting portion 100 which extends between the plate 92 and the head portion of one of the punch pins when the slide is moved to the left from the position shown in FIG. 1. If the die plate 94 and the block 87 are moved upwardly while any portions 100 of the slides overlie the punch pins, then thoes pins will operate to punch holes in the tape. One punch pin 101 is fixed to the plate 92 so it operates to punch a hole on each upward movement of the die. These holes are used in feeding tape during operation of the machine.

For moving the die plate on the rods 93, there is provided a block 103 connected to each end of the die plate and having an opening 104 through which a shaft 105 extends. Mounted on the shaft within the openings are eccentric cams 106 acting on the sides of the openings for causing a reciprocation of the die plate during each rotation of the shaft. Fixed to one end of the shaft 105 is a gear 108 meshing with a gear 109 on a shaft 110 which is driven through bevel gears 111 from the shaft 43. During each rotation of the shaft 43, the sensing pins 10 are released to sense holes in the tape 2 and, at the same time, position the slides 25 for permitting a sensing member at one of the index positions to pass through openings in both the slides 25 and 69. At this time, the latch 80 is released from the lever 75 to permit movement of the slides 69 not held by the sensing member. This results in the positioning of projecting slide portions 100 over corresponding punch pins 88. The punch die plate and block 87 are then lifted by the eccentric cams 106 to effect a punching of tape 3.

As soon as the punching of holes in tape 3 has been completed, the tape is advanced by a stepped rotation of a sprocket wheel 114 engaging feed holes punched in the tape by pin 101. Rotation of the sprocket wheel is effected by a dog 115 engaging a ratchet wheel 116 which is fixed to a shaft 117 carrying the wheel 114. One end of the dog is pivotally connected to a lever 118 loosely mounted on the shaft 117 and engaging a cam 120 fixed to the shaft 105. The sprocket wheel is held against turning in a reverse feeding direction by a pawl 121 which is yieldingly held in engagement with the ratchet wheel 116.

Upon completing the punching of holes in tape 3, the bail 38 is rocked to lift the sensing members 29 from the slides. The bail 15 is then rocked to remove the sensing pins 10 from holes in the tape 2 and to return the slides 25 to their normal positions. It is then necessary that the slides 69 be returned to their inactive positions shown in FIG. 5. This is accomplished by energizing a solenoid 123 connected to the lever 75 as shown in FIG. 1. The solenoid is energized through a circuit including contacts 124 which are closed at the proper time by a cam 125 mounted on the shaft 110. This circuit extends from a positive source of power supply through the contacts 124, a conductor 126 and the solenoid 123 to ground.

It is sometimes desirable in the punching of tape to form either an even or an odd number of holes at each character position so a redundancy check may be made to determine whether or not an error exists. With the mechanism described above, a character may be represented by punching from one to five holes in tape 3. If the tape was to be punched for a redundancy check, then another hole would be punched at different character positions to make the count either odd or even, whichever was desired. The holes punched in the first five channels would still represent the character but this would not be read unless the total number of holes at each position was correct.

Figure 6:
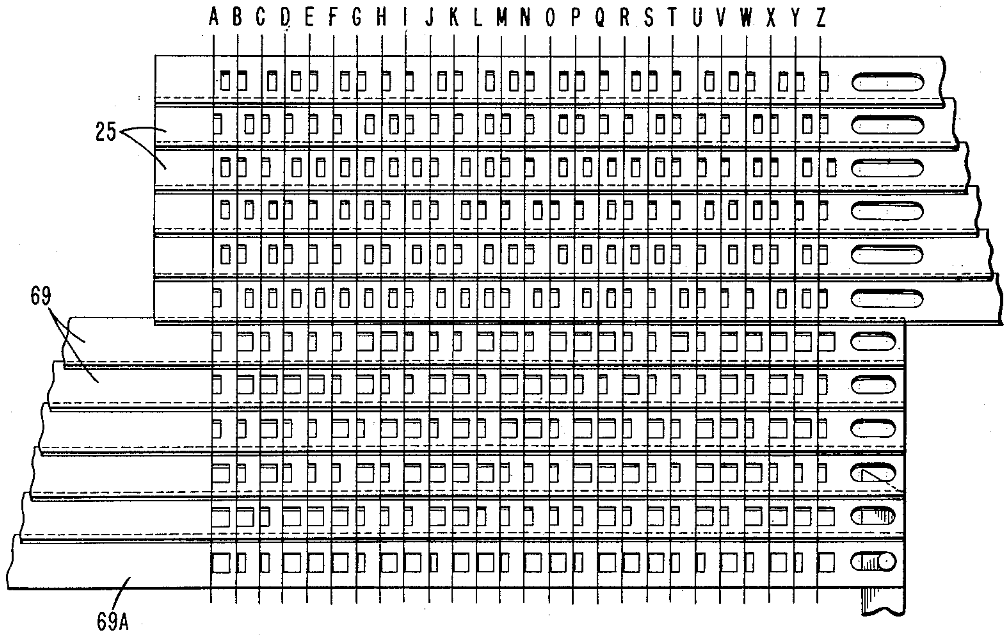
FIG. 6 is a view like FIG. 5 but including another slide operating with the encoding slides for effecting an odd punching of holes at each character position on a punched tape.

Punching of tapes for a redundancy check is easily accomplished with the mechanism described above. It is only necessary that another slide 69A (FIG. 6) be added and that the punch mechanism include a punch pin to be controlled by this slide. As shown by FIG. 6, the slide 69A is provided with openings which permit movement of the slide to effect punching so as to maintain the count odd at each character position in tape 3. For instance, the letter "A" is represented by punching two holes. Slide 69A is, therefore, provided with an elongated opening in the "A" position so it will move with the other two and result in the punching of three holes. In those positions where the character is represented by an odd number of holes, the slide 69A is provided with a small opening so it is held by the sensing member 29 against movement.

Figure 8:
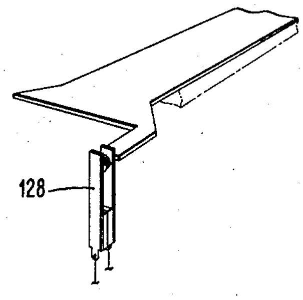
FIG. 8 shows the encoding slides operating to close electrical contacts.

It will be appreciated that the movement of slides 69 may control the operation of some mechanism other than a punch. There is shown in FIG. 8 a pair of contacts 128 associated with one of the slides 69. Such contacts may be provided for each of the slides and operate to control the energizing of circuits for producing a function corresponding to the sensing of any character. In the Hickerson application mentioned above, contacts are closed by similar slides to control the operation of a printing mechanism. The contacts 128 may be employed for controlling operation of the same printing mechanism.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A code converting mechanism comprising, in combination, a first group of elongated slides, means for moving said slides longitudinally in code combinations representative of characters, sensing members arranged along said slides at index points corresponding to said characters, openings in said slides for receiving said sensing members, said openings being normally out of alignment with each other at each of said index points but moving into alignment at any one of said points on movement of said slides in a code combination corresponding to the character at such point, a second group of slides arranged parallel to said first group and movable longitudinally between inoperative and operative positions, openings in said second group of slides in alignment with each other at said index points when said second group of slides are in their inoperative positions, said last mentioned openings adapted to receive said sensing members and being of such length that each of said second group of slides is either held by a sensing member against movement or is permitted to move to its operative position, means yieldingly urging said slides of said second group toward their operative positions, means releasably holding said second group of slides in their inoperative positions, means for engaging said sensing members with said first group of slides after the latter have been moved in a code combination representative of a character, the sensing member at the index point corresponding to such character then passing through aligned openings in said groups of slides, means for releasing said holding means after one of said sensing members has moved through openings in said second group of slides, the slides of said second group then moving to their operative positions in code combinations determined by the lengths of openings formed therein, and means operated by said second group of slides when moved to operative positions for producing a function corresponding to the combination of slides moved.

2. A mechanism for reading characters represented by holes punched in a first tape according to one code and punching holes in a second tape to represent the same characters according to a second code comprising, in combination, a group of decoding slides, means including pins sensing holes in said first tape and operating on the sensing of holes to move said slides in code combinations representative of characters sensed, sensing members located at index points corresponding to different characters, a group of encoding slides movable between inoperative and operative positions, openings in said encoding slides adapted to receive said sensing members and being of such length that each of said encoding slides is either held by a sensing member against movement or is permitted to move to its operative position, means operating after movement of said decoding slides in a code combination for moving said sensing members toward said encoding slides, said decoding slides being shaped to block movement of all of said sensing members except the one located at the index point corresponding to the character represented by the combination of decoding slides moved, the sensing member at such point then passing through the openings in said encoding slides, means for yieldingly urging said encoding slides toward their operative positions, means releasably holding said encoding slides in their inoperative positions, means operating after movement of a sensing member through said openings in said encoding slides for releasing said holding means, and means controlled by said encoding slides on movement to their operative positions for effecting a punching of holes in said second tape.

3. The mechanism of claim 2 in which said last mentioned means comprises a die plate, a plurality of punch elements, means yieldingly supporting said punch elements over said die plate, means cyclically moving said die plate and said punch elements therewith, and projecting portions on said encoding slides, each movable into a position for blocking movement of one of said punch elements during movement of said die to effect a punching operation.

4. A mechanism for reading characters represented by holes punched in a first tape according to one code and punching holes in a second tape to represent the same characters according to a second code comprising, in combination, a first group of elongated slides, means including pins sensing holes in said first tape and operating on the sensing of holes to move said slides longitudinally in code combinations representative of the character sensed, sensing members arranged along said slides at index points corresponding to different characters, openings in said slides for receiving said sensing members when in alignment at said index points, said openings being normally out of alignment but moving into alignment at any one of said points on movement of said slides in a code combination corresponding to the character at such point, a second group of slides movable longitudinally between inoperative and operative positions, openings in said second group of slides in alignment with each other at said index points when said second group of slides are in their inoperative positions, said last mentioned openings adapted to receive said sensing members and being of such length that each of said second group of slides is either held by a sensing member against movement or is permitted to move to its operative position, means yieldingly urging said slides of said second group toward their operative positions, means releasably holding said second group of slides in their inoperative positions, means for engaging said sensing members with said first group of slides after the latter have been moved in response to the sensing of holes in said first tape, the sensing member at the index point corresponding to the character sensed then passing through aligned openings in said groups of slides, means for releasing said holding means to permit movement of said second group of slides not held by said sensing member, and means controlled by said second group of slides on movement to their operative positions for effecting a punching of holes in said second tape.

5. The mechanism of claim 4 in which said second group of slides includes a plurality of slides having openings permitting their movement to effect a punching of holes representing characters according to said second code, and a single slide in said second group having openings permitting its movement to effect a punching of holes so as to permit a redundancy check.

References Cited in the file of this patent

UNITED STATES PATENTS

| | | |
|---|---|---|
| 2,537,168 | Spencer | Jan. 9, 1951 |
| 2,857,001 | Braun | Oct. 21, 1958 |